(No Model.)
A. P. BOHLINGER.
BASKET HAMPER.
No. 446,578. Patented Feb. 17, 1891.
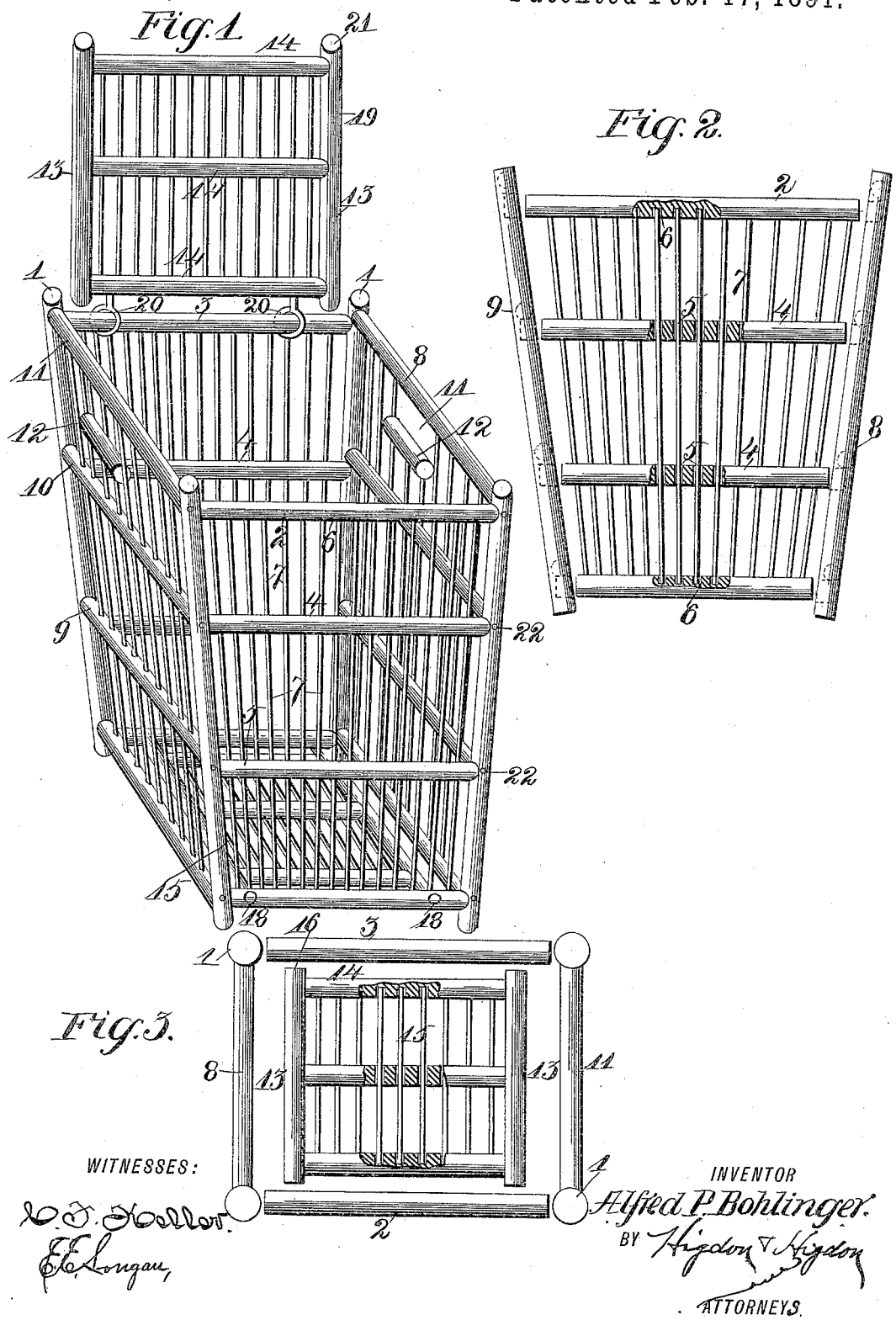
WITNESSES:
INVENTOR
Alfred P. Bohlinger.
BY Higdon & Higdon
ATTORNEYS.

UNITED STATES PATENT OFFICE.

ALFRED P. BOHLINGER, OF ST. LOUIS, MISSOURI.

BASKET-HAMPER.

SPECIFICATION forming part of Letters Patent No. 446,578, dated February 17, 1891.

Application filed July 16, 1890. Serial No. 358,880. (No model.)

*To all whom it may concern:*

Be it known that I, ALFRED P. BOHLINGER, of St. Louis, in the State of Missouri, have invented certain new and useful Improvements in Baskets, of which the following is a full, clear, and exact description, reference being had to the accompanying drawings, forming a part thereof.

My invention has for its object to provide a novel and simplified construction in baskets; and it consists in the combination and arrangement of parts, as will be hereinafter fully described, and designated in the claims.

In the drawings, Figure 1 is a perspective view of a clothes-hamper constructed according to my invention. Fig. 2 is a front elevation of a clothes-basket with the sides thereof detached. Fig. 3 is a top plan view of the same, the parts thereof being detached.

The object of my invention is to produce a basket that can be easily and readily knocked down for the purpose of packing and shipping, whereby a comparatively small package is produced, reducing greatly the cost of expressage.

A basket constructed according to my in-invention not only presents a neat and attractive appearance, but one that is strong and durable.

Referring to the drawings, 1 in Fig. 1 represents four upright posts suitably bored to receive the front, back, sides, and bottom, which, when combined or united as shown, produces what is commonly known as a "clothes-hamper." The front section 2 and back section 3 are composed each of four horizontal cross-bars 4, the ends of which are of sufficient size to enter one vertical series of holes in the upright posts 1. A sufficient number of vertical holes 5 are formed in the two center cross-bars 4 and extend entirely through the same, the upper and lower bars of which are only bored about one-half their thickness, as shown at 6. Through the holes 5 of the horizontal cross-pieces 4 is placed a series of rods 7, the ends of which are inserted in the holes 6, formed in the upper and lower bars, and are covered and protected thereby. The sides 8 and 9 are each constructed in substantially the same manner, the horizontal cross-bars 10 of which are bored in a like manner in reference to the front and back, the only material difference being that hand-holes 11 are formed therein about midway of the said sides or sections and next to the upper bars thereof. The hand-holes 11 are formed by shortening several of the rods 7, leaving sufficient space, the ends of which rods are inserted and fastened into holes formed in a short horizontal bar 12, strengthening the same and presenting a neat and finished appearance. The top and bottom of the clothes-hamper are constructed in a like manner, and each consists of two parallel bars 13 and three transverse parallel bars 14, the ends of which are inserted and fastened in holes or openings formed for their reception in the said bars 13, forming when united a strong frame. Within the frame thus formed is secured a series of rods 15 and fastened in a manner as previously described. The projecting ends 16 of the bottom 17 are inserted in openings 18, formed in the lower horizontal cross-bars of the front and back sections of the hamper, the said bottom being securely held thereby. The cover or lid 19 is secured to the hamper by screw-eyes 20, the eye of which encircles the upper horizontal cross-bar 4 and the screw portion fastened into one of the bars 14 of the said cover, the projecting ends 21 of which rests upon the top of the hamper when the cover is in a closed position.

22 represents wire nails, screws, or other like devices for securing the several parts or sections of my invention together.

I am aware that prior to my invention baskets have been constructed of a series of slats and having wire twisted between them for the purpose of strengthening the same, such as shown in Patent No. 421,368 of the United States.

In my invention I dispense with the twisted wire and substitute in place thereof cross-bars suitably bored to receive the vertical rods, which enables me to produce a basket that is ornamental in appearance, cheap in its manufacture, and also one that can be easily knocked down or taken apart for the purpose of shippage, reducing greatly the cost of the same.

My basket, as shown, is constructed entirely of hard wood, which is steamed to conform to any shape or design desired, the holes for receiving the remaining parts of the basket being afterward bored.

Having fully described my invention, what I claim is—

1. A basket consisting of horizontal upper, lower, and intermediate rods, the said intermediate rods having holes bored therethrough and the said upper and lower rods having holes bored therein but not extending therethrough, upright bars passing through the holes in the intermediate rods and having their ends contained in the holes in the upper and lower rods, forming side panels, upright corner-posts having holes in their sides, the said holes receiving the horizontal rods of both the contiguous sides, and a top and bottom, each composed of parallel side bars 13 and transverse intermediate and end bars 14, having their ends contained within holes in the said side bars, and a series of rods passing through holes in the intermediate transverse bars and having their ends secured in holes in the transverse end bars, the said parallel side bars of the bottom having their ends contained within holes in two opposite lower horizontal rods, one of the transverse end bars of the top being pivoted to one of the upper horizontal rods by screw-eyes, through which the said upper rod passes, as described.

2. A basket consisting of horizontal upper, lower, and intermediate rods having holes bored therethrough, and the said upper and lower rods having holes bored therein but not extending therethrough, upright bars passing through the holes in the intermediate rods and having their ends contained in the holes in the upper and lower rods, forming side panels, upright corner-posts having holes in their sides, the said holes receiving the horizontal rods of both the contiguous sides, and a bottom composed of parallel side bars 13 and transverse intermediate end bars 14, having their ends contained within holes in the said side bars, and of a series of rods passing through holes in the intermediate transverse bars and having their ends secured in the holes in the transverse end bars, the said parallel side bars of the bottom having their ends contained within holes in the two opposite lower horizontal rods, as described.

In testimony whereof I affix my signature in presence of two witnesses.

ALFRED P. BOHLINGER.

Witnesses:
C. F. KELLER,
JNO. C. HIGDON.